Sept. 15, 1964  S. M. BAGNO ET AL  3,149,318
TEMPERATURE COMPENSATED SENSITIVITY CONTROL
NETWORK FOR DISTURBANCE
DETECTING APPARATUS
Filed Sept. 11, 1959

INVENTORS
SAMUEL M. BAGNO
JOHN H. FASAL
BY
Ernest P. Joenen
ATTORNEY

United States Patent Office 3,149,318
Patented Sept. 15, 1964

3,149,318
TEMPERATURE COMPENSATED SENSITIVITY CONTROL NETWORK FOR DISTURBANCE DETECTING APPARATUS
Samuel M. Bagno, Belleville, N.J., and John H. Fasal, New York, N.Y., assignors to Specialties Development Corporation, Belleville, N.J., a corporation of New Jersey
Filed Sept. 11, 1959, Ser. No. 839,375
5 Claims. (Cl. 340—258)

The present invention relates to apparatus for detecting disturbances in an enclosure by giving an alarm in response to the detection of changes in frequency of generated and received radiations due to disturbances in the enclosure, and, more particularly, to compensating an automatic sensitivity control network of such apparatus for changes in temperature.

Heretofore, it has been found that the sensitivity of apparatus for detecting disturbances in an enclosure can be controlled automatically in several ways. For example, this can be accomplished by using an electronic amplitude control element such as a transistor for regulating the detector, and utilizing the output of a network which is controlled by a sampling signal to in turn regulate the transistor in response to the amplitude of the sensed sampling signal. Such apparatus is disclosed in copending application for Letters Patent of the United States, Serial No. 671,571, filed July 12, 1957, now Patent No. 2,987,713, June 6, 1961.

It has now been found that such apparatus can control sensitivity within narrow limits provided that the temperature of the enclosure does not vary too greatly, because of the temperature sensitivity of the transistor network. Consequently, when the apparatus is adjusted to a desired sensitivity at the temperature normally expected and this sensitivity is controlled to compensate for changes within the enclosure, a deviation of ten degrees plus or minus, from the normal temperature will affect the proper control of sensitivity.

Accordingly, an object of the present invention is to provide temperature compensated sensitivity control means for disturbance detecting apparatus of the type indicated herein.

Another object is to provide such apparatus which compensates for wide temperature variations in the enclosure within very close limits.

A further object is to provide such a system which facilitates adjusting the sensitivity to be maintained at a predetermined value.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein:

FIG. 3 is a circuit diagram of an amplifier network for the network shown in FIG. 2.

Figure 1:
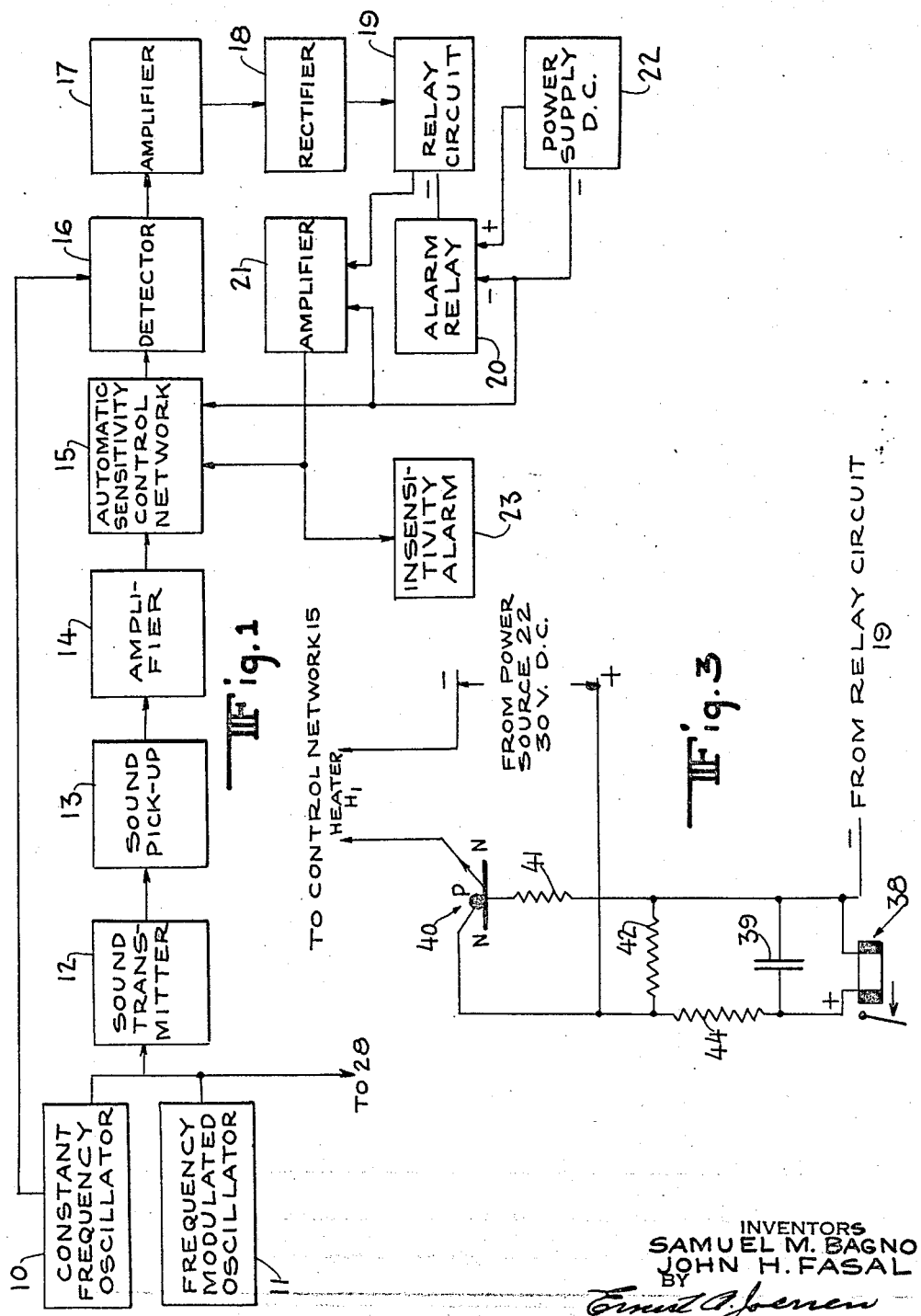
FIG. 1 is a block diagram of an apparatus for detecting disturbances in an enclosure which embodies the sensitivity control in accordance with the invention.

Referring to the drawings in detail, a block diagram is shown in FIG. 1 which illustrates the essential components of the apparatus in accordance with the present invention including the components, or their equivalents, of the previously known apparatus to which the present invention is applied. Thus, for a better understanding of the present invention in relation to its field of application, the block diagram will be described first with reference only to the prior apparatus.

Generally described, one form of such prior apparatus comprises a constant frequency oscillator 10, a frequency modulated oscillator 11 which cooperates with the oscillator as described hereinafter, a sound transmitter 12, connected to the outputs of the oscillators 10 and 11 adapted to radiate a standing sound wave energy pattern within an enclosure and the control signal, a sound pick-up 13 for receiving sound energy radiation and transducing the same to electrical radiations, a high frequency amplifier 14 having its input connected to the output of the sound pick-up, an automatic sensitivity control network 15 having an input operatively connected to the output of the amplifier 14, a detector 16 having an input connected to the output of the network 15 and having an input operatively connected to the constant frequency oscillator 10 for giving a fluctuating current output upon the detection of frequency changes between the transmitted and received radiations and oscillations, a low frequency amplifier 17 having its input connected to the detector output, a rectifier 18 having its input connected to the output of the amplifier 17, a relay circuit 19 having its input connected to the output of the rectifier, and a relay and alarm network 20 having its input connected to the output of the relay circuit, the network 15 having a compensating input under the control of the relay circuit output.

The motion of an intruder or other disturbance within the enclosure sought to be detected produces a "Doppler" frequency in the wave pattern, whereby the received frequency becomes either greater or less or with multiple reflection both greater and less simultaneously than the transmitted frequency. This change in frequency is of a relatively low order and is detected by the detector 16, whereupon the detector generates a signal which is amplified and rectified and is caused to operate the alarm 20.

Since the amplitude of the received signal going into the detector can vary because of acoustical changes in the enclosure or sensitivity changes in the apparatus itself and the amplitude of the disturbance in the enclosure may be of various magnitudes depending on the size of the moving object, there is no assurance that the detector will be sensitive at all times to a disturbance of a minimum amplitude which is to be detected and that the detector will be insensitive at all times to a disturbance of a maximum amplitude which is not to be detected.

The sensitivity of the apparatus so far described, in general, is controlled by the interaction of the signals generated by the oscillators 10 and 11 which causes the detector to generate in the final output a low frequency pulse in the manner about to be more fully described. This pulse is amplified and rectified and is conducted to the automatic sensitivity control network 15 which controls the amplitude of the signal the detector receives from the amplifier 14 on an inverse order of magnitude in relation to the amplitude of the pulses.

The oscillator 10 may generate radiations having a substantially constant frequency of about 19.2 kilocycles per second, and the oscillator 11 may generate radiations having a modulated frequency within a band ranging from about 14 to about 24 kilocycles per second. Thus, when these radiations pass through the detector 16, a pulse is generated each instant the modulated frequency approaches the constant frequency. By the selection of the foregoing frequency values, such pulses are generated at about one second intervals.

The amplitude of the pulses for any fixed acoustic condition within the enclosure varies with the phase relationship of the voltage of the constant frequency radiations and the modulated frequency radiations at the instant their frequencies coincide. When these radiations are exactly in phase at the time these frequencies are equal, the pulse will be of a maximum value, and, when they are exactly 90° out of phase, the value of the pulse will be nearly zero. Over a period of several minutes, the pulse amplitude is varied throughout the entire gamut of the phase relationship, whereby the average amplitude of the pulses over such a period will provide a good indication of the acoustic properties of the enclosure change, and such change is reflected by the change in average pulse amplitude.

The amplified and rectified pulses pass through the relay circuit together with such steady state unidirectional current which results from the detection of frequency changes between transmitted and received radiations and are conducted to the relay and the alarm network. This network is rendered operative by the steady state current, but is rendered insensitive to the pulses by utilizing a slow acting relay arrangement.

For example, the relay and alarm network may comprise a relay, a resistor connected in series with the relay across the relay circuit output, a capacitor shunted across the relay, to provide a time delay arrangement, and an indicating device, such as a light or bell or the like, under the control of switch contacts of the relay which has its output connected to the sensitivity control network 15. A direct current source 22 powers the relay circuit 19, the alarm relay 20 and the amplifier 21. An insensitivity alarm 23 is connected to the output of the amplifier 21 and gives an indication when the amplifier output drops below a predetermined minimum value.

Figure 2:
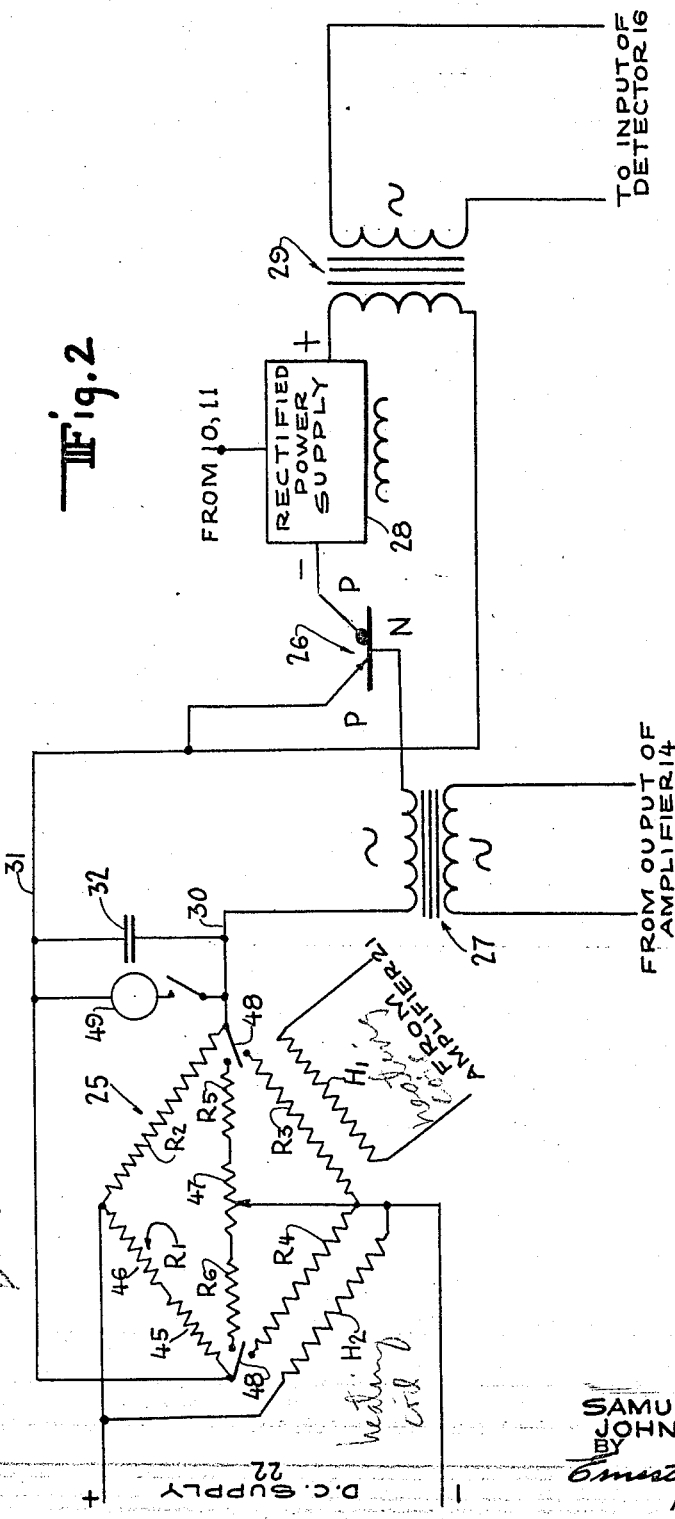
FIG. 2 is a circuit diagram of a sensitivity regulating network with which the present invention is primarily concerned.

In FIG. 2, a wiring diagram is shown which illustrates the automatic sensitivity control network 15. This network generally comprises a direct current powered, normally balanced resistance type bridge 25 adapted to be modified by variations in signal amplitude as about to be described, a P-N-P type transistor 26 connected to the D.C. output of the bridge and coupled to the A.C. output of the amplifier 14 through a transformer 27, and a source of uni-directional current 28 which may be derived by rectifying the output of the oscillators 10 and 11, thus isolating the power supply for the transistor 26 direct current-wise from the source 22. The transistor amplifies the input which is converted to alternating current by a transformer 29 coupled to the input of the detector 16. If desired, the source 28 could be a battery.

The bridge 25 comprises resistors $R_1$ and $R_2$ connected in the first side and temperature sensitive resistors $R_3$ and $R_4$ connected in the second side, and heaters $H_1$ and $H_2$ for the resistors $R_3$ and $R_4$, respectively. The resistors $R_3$ and $R_4$ are constructed of a material having a high temperature coefficient of resistivity such as nickel wire. The heaters $H_1$ and $H_2$ change the resistance of these resistors by changing their temperature and thereby controlling the bridge balance. The negative and positive terminals of the direct current source 22 are connected across the junction of the resistors $R_3$ and $R_4$ and the junction of the resistors $R_1$ and $R_2$, respectively. The heater $H_1$ is connected across the D.C. output of the amplifier 21, the heater $H_2$ is connected across the source 22, and the conductors 30 and 31 are connected to the junction of the resistors $R_2$ and $R_3$ and the junction of the resistors $R_1$ and $R_4$, respectively to provide the bridge output connection.

In this manner, the bridge remains in balance when the heaters $H_1$ and $H_2$ supply the same heat to adjust the resistance of their respective temperature sensitive resistors $R_3$ and $R_4$ to the same value, whereby the bridge can be unbalanced in either direction when inputs of the heaters vary and cause them to heat their resistors differently.

For example, when the heater $H_1$ is hotter than the heater $H_2$, the resistor $R_3$ is less conductive than the resistor $R_4$ and current flows through the conductor 30 towards the right and through the conductor 31 towards the left. Similarly, when the heater $H_2$ is hotter than the heater $H_1$, the resistor $R_3$ is more conductive than the resistor $R_4$ and current flows through the conductor 30 towards the left and through the conductor 31 towards the right.

In the event the bridge is in balance when no heat has been applied to the heaters and the heater $H_1$ is hotter than the heater $H_2$, the resistor $R_3$ then is less conductive than the resistor $R_4$ and current flows through the conductor 30 towards the right and through the conductor 31 towards the left. Similarly, under these conditions when the heater $H_2$ is hotter than the heater $H_1$, the resistor $R_3$ is more conductive than the resistor $R_4$ and current flows through the conductor 30 towards the left and through the conductor 31 towards the right.

The base (N) of the transistor 26 is connected to the conductor 30 through the secondary or output coil of the transformer 27, the emitter (P) of the transistor is connected to the conductor 31 and to the positive terminal of the battery 28 through the primary or input coil of the transformer 29, and the collector (P) of the transistor is connected to the negative terminal of the battery 28. A capacitor 32 is connected across the conductors 30 and 31 to short circuit the A.C. component but not the D.C. bias from the bridge.

Thus, when the signal from the relay circuit 19 passing through the amplifier 21 to the heater $H_1$ has an output approaching the output of the source 22 supplied to the heater $H_2$, the heater $H_1$ causes the resistor $R_3$ to become less conductive than the resistor $R_4$, whereby the bridge is changed in the direction to cause the bridge to approach balance and thereby reducing the bias on the base of the transistor. This reduces the current flow from the emitter to the collector and likewise the mutual conductance of the transistor and proportionately reduces the output of the transformer 29 which is coupled to the input of the detector 16.

Likewise, when the signal from the relay circuit 19 passing through the amplifier 21 to the heater $H_1$ has a much weaker output than the output of the source 22 supplied to the heater $H_2$, the heater $H_1$ is less effective and causes the resistor $R_3$ to become more conductive than the resistor $R_4$, whereby the bridge is unbalanced in the direction to cause current to flow through the conductor 30 towards the left and increases the bias on the base of the transistor. This increases the current flow from the emitter to the collector in proportion to the degree of unbalance of the bridge and proportionately increases the mutual conductance and thereby increases the output of the transformer 29 which is coupled to the input of the detector 16.

The heating and cooling cycles of the resistors are symmetrical in this unit. When the system is first put into operation, both heaters are cold and the bridge is in balance whereby no signal gets through to create an overload condition. As the heater $H_2$ across the D.C. line heats up it increases the resistance of the resistor $R_4$, unbalancing the bridge and biasing the transistor 26 into its amplifying condition. As the transistor 26 starts amplifying, the test pulses generated in the detector become amplified and fed to the heater $H_1$. The heater $H_1$ proceeds to heat the resistor $R_3$ which also increases in temperature, and tends to keep the bridge from further unbalance. In that way the amplification of the transistor 26 becomes controlled by the strength of the received signal from the test pulses.

The alarm relay 20 and the amplifier network 21 and the manner in which they are connected to the relay circuit and the D.C. power supply 22 are shown in FIG. 3.

The alarm relay 20 includes a relay 38 and a capacitor 39 connected across the relay to delay its operation. The relay has one of its terminals connected to the negative side of the relay circuit 19 and has its other terminal connected to the positive side of the D.C. power source 22.

The amplifier network 21 includes a transistor 40 of the N-P-N type which has its base (P) connected to the negative side of the relay circuit 19 through a resistor 41 and has its collector (N) connected to the positive side of the D.C. power source 22. A resistor 42 is connected in parallel with the capacitor 39 across the negative side of the relay circuit 19 and the positive side of the D.C. power source 22 for feeding pulses from the relay circuit to the collector of the transistor, and an isolating resistor 44 is connected in series with the capacitor 39 and the resistor 42, whereby these pulses are not affected by the capacitor 39. One terminal of the heater $H_1$ is connected to the emitter (N) of the transistor and the other terminal thereof is connected to the negative side of the D.C. power source 22.

With this arrangement, as the output of the relay circuit 19 becomes stronger, more bias is put on the transistor base to proportionately decrease the power supplied to the heater $H_1$. Conversely, as the output of the relay circuit becomes weaker, less bias is put on the transistor base to proportionately increase the power supplied to the heater $H_1$. Thus, in this manner, as the change in acoustic properties within an enclosure tend to make the detecting system more receptive to disturbances, the system is proportionately de-sensitized and vice versa. It has been found that the transistor 26 changes its mutual conductance with ambient temperature changes unless the entire circuit is temperature stabilized. This temperature stabilization is obtained by making use of a newly discovered property of the transistor, namely that mutual conductance can be kept constant over the ambient temperature range if a bias voltage change, directly proportional to the change in temperature, is applied to the base of the transistor 26. In this circuit that bias voltage change is obtained in the manner about to be described. The non-sensing resistors $R_1$ and $R_2$ have such different temperature coefficients that a change in temperature will produce a corresponding change in base bias voltage of just a sufficient value to compensate for the ambient temperature change and maintain the necessary mutual conductance which has been determined by the rest of the automatic sensitivity control circuit.

In accordance with the present invention, the resistor $R_1$ includes a pair of resistor elements 45 and 46 connected in series. The element 45 is exposed to changes in ambient temperature which take place in the enclosure, and has a positive temperature coefficient of resistivity 0.005 ohm per ° C. and has a resistance of 245 ohms at 20° C. The element 46 is unaffected by temperature changes, that is, its temperature coefficient of resistivity is zero, and has a resistance of 125 ohms at any temperature. In that way the bridge is made to change its balance with a change in ambient temperature in such a way that a bias voltage change proportional to the temperature change is introduced on the base of transistor 26. This keeps the gain independent of temperature.

While the temperature compensating resistor elements 45 and 46 have been described as having utility in a heat controlled bridge, it will be understood that this arrangement has general utility in other installations for regulating the gain of a transistor or other amplitude controlling device.

In order to facilitate adjusting the bridge to predetermine the cut-off point of the transistor 26, a fifth resistor $R_5$, a sixth resistor $R_6$ and a potentiometer 47 are connected in series with the latter between these resistors; and switch means 48, which may be arranged as a double pole double throw switch, are provided for disconnecting the second side, resistors $R_3$ and $R_4$, from the bridge and connecting in its place the resistors $R_5$ and $R_6$ and the potentiometer 47, and vice versa.

When the resistors $R_5$ and $R_6$ and the potentiometer are connected in the bridge, the bridge is in non-regulated condition. Adjustment of the bridge can then be made by setting the potentiometer 47 to give the bridge the desired unbalance to control the gain of the transistor 26, and measuring the unbalance of the bridge by a meter 49. The bridge is then put into regulated condition by reconnecting the resistors $R_3$ and $R_4$ in the bridge, and the amplitude of the sampling signal is adjusted to effect heating of the heater $H_1$ to unbalance the bridge to the previously measured degree of unbalance.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. In indicating apparatus the combination of means including an electronic detecting system having an input and an output for generating an indicating signal and for generating a sampling signal related to the sensitivity of said apparatus, means connected to said output for giving an indication when said indicating signal is of a predetermined amplitude, and a control network having an input connected to said output for receiving the sampling signal and having an output connected to the input of said detecting system and including an element for controlling the amplitude of its output, said network comprising a normally balanced resistance-type bridge including a first side having first and second resistors connected in series and including a second side having third and fourth resistors connected in series which are subject to change in resistance due to heating, a heater for said third resistor connected to be controlled by the sampling signal, a source of energy connected across the junction of said first and second resistors and the junction of said third and fourth resistors, and a heater for said fourth resistor connected across said source of energy, said bridge having an output across the junctions of the sides thereof connected to said control element for controlling the same, one of said resistors in said first side including a pair of elements connected in series one of which is exposed to changes in temperature and has a positive temperature coefficient of resistivity and thereby is affected by ambient temperature changes and the other of which is unaffected by temperature changes, whereby said control element can be regulated for changes in temperature.

2. In a network for controlling the sensitivity of apparatus for detecting disturbances within an enclosure by detecting frequency changes between transmitted and received energy radiations, the combination of means including a detecting system having an input and an output for generating a difference frequency signal in response to a disturbance and for generating a sampling signal related to the sensitivity of said apparatus, means connected to said output for giving an indication when said difference frequency is of a predetermined amplitude, and a control network having an input connected to said output for receiving the sampling signal and having an output connected to the input of said detecting system and including an element for controlling the amplitude of its output, said network comprising a normally balanced resistance-type bridge including a first side having first and second resistors connected in series and including a second side having third and fourth resistors connected in series which are subject to change in resistance due to heating, a heater for said third resistor connected to be controlled by the sampling signal, a source of energy connected across the junction of said first and second resistors and the junction of said third and fourth resistors, and a heater for said fourth resistor connected across said source of energy, said bridge having an output across the junctions of the sides thereof connected for controlling said control element, one of said resistors in said first side including a pair of elements connected in series one of which is exposed to changes in temperature and has a positive temperature coefficient of resistivity and thereby is affected by ambient temperature changes and the other of which is unaffected by temperature changes, whereby said control element can be regulated for changes in temperature.

3. In a network for controlling the sensitivity of apparatus for detecting disturbances within an enclosure by detecting frequency changes between transmitted and received energy radiations, the combination of means including a detecting system having an input and an output for generating a difference frequency signal in response to a disturbance and for generating a sampling signal related to the sensitivity of said apparatus, means connected to said output for giving an indication when said difference frequency is of a predetermined amplitude, and a control network having an input connected to said output for receiving the sampling signal and having an output connected to the input of said detecting system and including a PNP transistor for controlling the amplitude of its output having its base connected to one side of said control network input and having its emitter connected to one side of said control network output, and including a source of direct current having its negative terminal connected to the collector of said transistor and its positive terminal to the other side of said control network output, said network further comprising a normally balanced resistance-type bridge including a first side having first and second resistors connected in series and including a second side having third and fourth resistors connected in series which are subject to change in resistance due to heating, a heater for said third resistor connected to be controlled by the sampling signal, a source of direct current connected across the junction of said first and second resistors and the junction of said third and fourth resistors, and a heater for said fourth resistor connected across said source of energy, said bridge having an output across the junctions of the sides thereof, one output junction being connected to the other side of the network input and the other output junction being connected to the emitter of said transistor, one of said resistors in said first side including a pair of elements connected in series one of which is exposed to changes in temperature and has a positive temperature coefficient of resistivity and thereby is affected by ambient temperature changes and the other of which is unaffected by temperature changes, whereby said control element can be regulated for changes in temperature.

4. In a network according to claim 3, including a meter connected across the junctions of the sides of said bridge, a potentiometer connected in series with said fifth and sixth resistors and having a connection to the junction of said third and fourth resistors for adjusting the unbalance of said bridge to determine the gain of said transistor by said meter, and means for disconnecting said second side from said bridge and connecting said fifth resistor, sixth resistor and said potentiometer in said bridge in place thereof and vice versa.

5. Controlled amplifier apparatus comprising a transistor provided with base, emitter, and collector electrodes and subject to variations in mutual conductance in response to variations in the ambient temperature of the atmosphere surrounding said apparatus; means for impressing upon said transistor a signal to be amplified thereby; and means for biasing said transistor to amplify said signal and for varying the bias voltage in response to variations in said ambient temperature such that the bias voltage changes by an amount which is directly proportional to the change in said ambient temperature, said biasing means including a source of power, first and second resistance elements connected in series across said source, third and fourth resistance elements connected in series across said source, said transistor having its base connected to the junction of said first and second resistance elements and its emitter connected to the junction of said third and fourth resistance elements, one of said resistance elements including first and second resistors connected in series, said first resistor having a resistance value unaffected by temperature change and said second resistor having a resistance value affected by temperature change and subjected to said ambient temperature for producing changes in the bias voltage which are directly proportional to the changes in the ambient temperature, other of said resistance elements having resistance values affected by temperature changes, and electrically energized heating means for heating said other elements above said ambient temperature to control the output of said transistor.

References Cited in the file of this patent

UNITED STATES PATENTS

| | | |
|---|---|---|
| 2,751,549 | Chase | June 19, 1956 |
| 2,806,200 | Ketchledge | Sept. 10, 1957 |
| 2,823,312 | Keonjian | Feb. 11, 1958 |
| 2,831,114 | Overbeek | Apr. 15, 1958 |
| 2,915,600 | Starke | Dec. 1, 1959 |
| 2,987,713 | Bagno | June 6, 1961 |
| 3,005,958 | Grant | Oct. 24, 1961 |

FOREIGN PATENTS

| | | |
|---|---|---|
| 758,991 | Great Britain | Oct. 10, 1956 |
| 565,654 | Canada | Nov. 4, 1958 |